United States Patent

Douglas

[15] 3,638,743
[45] Feb. 1, 1972

[54] BELT CONVEYOR WEIGH SCALE
[72] Inventor: Edwin J. Douglas, Whittier, Calif.
[73] Assignee: Hardy Scales Company, Maywood, Calif.
[22] Filed: Mar. 5, 1970
[21] Appl. No.: 16,695

[52] U.S. Cl. ..................................................177/16, 198/39
[51] Int. Cl. ............................................................G01g 11/14
[58] Field of Search .......................................177/16, 19–21, 177/253; 198/39

[56]  References Cited

UNITED STATES PATENTS

| 3,133,605 | 5/1964 | Christmann | 177/16 |
| 3,324,960 | 6/1967 | Bauer et al. | 177/16 |
| 3,498,396 | 3/1970 | Johnston | 177/16 |

*Primary Examiner*—Richard B. Wilkinson
*Assistant Examiner*—George H. Miller, Jr.
*Attorney*—Mallinckrodt & Cornaby

[57]  ABSTRACT

A base platform is suspended from within a supporting framework by load cells, preferably arranged as a three-point suspension. Belt conveyor pulleys, mounted between uprights rising from the base platform, provide a flat and elongate upper run for a conveyor belt adapted to receive and convey material such as parcel post packages to be weighed. Drive means are also supported by the base platform, and special belt-aligning means are provided to keep the belt tracking properly.

14 Claims, 5 Drawing Figures

INVENTOR.
EDWIN J. DOUGLAS

BY Mallinckrodt and Cornaby
ATTORNEYS

INVENTOR.
EDWIN J. DOUGLAS

BELT CONVEYOR WEIGH SCALE

BACKGROUND OF THE INVENTION

1. Field

The invention is in the field of weigh scales for obtaining the weights of traveling loads.

State of the Art

Many types of weigh scales for use with belt conveyors are known and widely used, but none are specially adapted to receive and weigh parcels of a variety of shapes and sizes.

BRIEF SUMMARY OF THE INVENTION

The present invention provides a weigh scale with a load-receiving platform in the form of a conveyor belt that carries loads, such as but not limited to parcels of a variety of shapes and sizes, from one location to another during the weighing operation. The upper run of the belt is flat and elongate and is preferably supported by a slide plate extending between head and tail pulleys and having its upper surface tangent to such pulleys. The conveyor belt, its supporting pulleys, and the drive means therefor are all mounted on and supported by a base platform that is suspended from a supporting framework by load cells that are preferably arranged to provide a three-point suspension. Bearings for the head and tail pulleys are arranged so as to be out of the way and not constitute obstacles to the received and conveyed load, and special belt-aligning means in the form of abutment guides for the belt and for head and tail roller pulleys are preferably provided to keep the belt tracking properly.

THE DRAWINGS

A weigh scale representing the best mode presently contemplated of carrying out the invention is shown in the accompanying drawings, in which:

FIG. 1 is a top plan view of the weigh scale, with certain of the hidden internal parts indicated by dotted lines;

FIG. 2, a side elevation;

FIG. 3, an end elevation looking from the right in FIG. 2;

FIG. 4, a fragmentary longitudinal vertical section taken along the line 4—4 of FIG. 3 and drawn to a larger scale; and FIG. 5, a fragmentary transverse vertical section taken along the line 5—5 of FIG. 4.

DETAILED DESCRIPTION OF THE ILLUSTRATED EMBODIMENT

Figure 1:
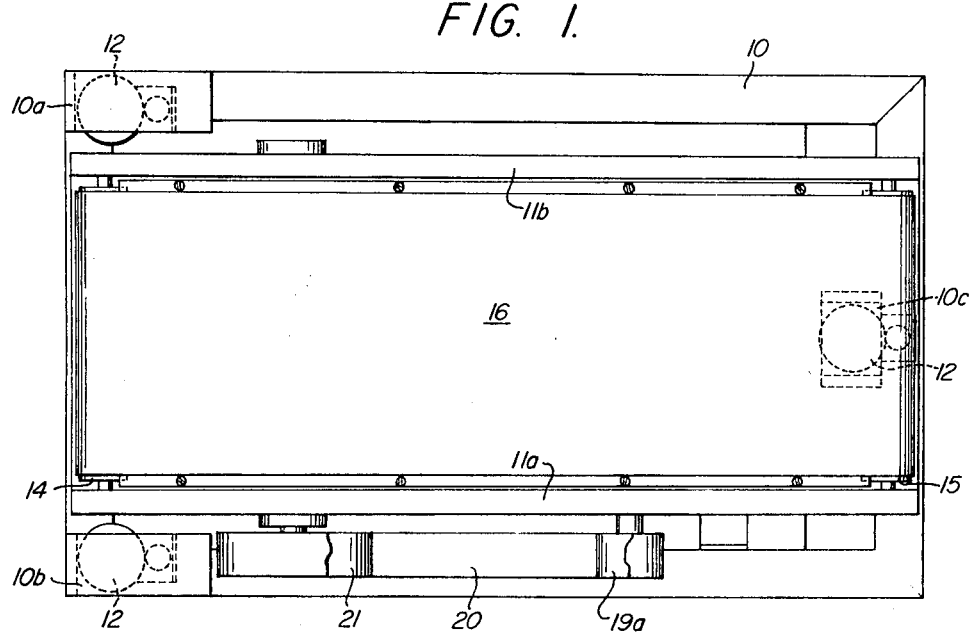
Figure 2:
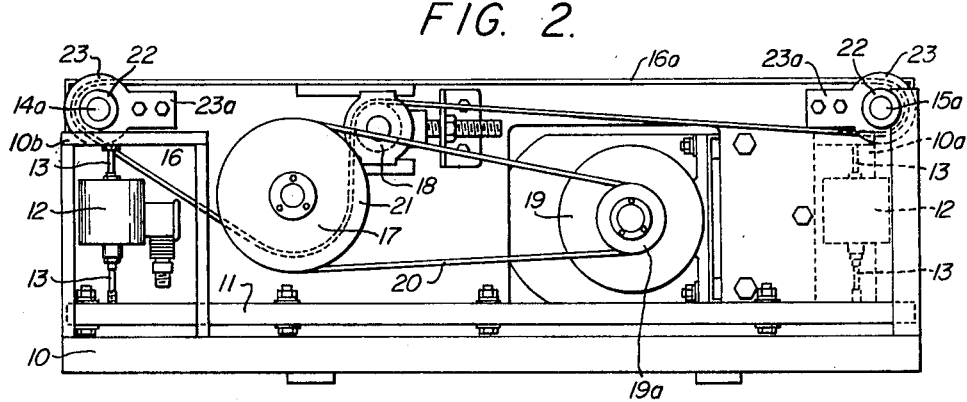

In the form illustrated, the belt conveyor weigh scale of the invention comprises a stationary supporting framework 10 from which is flexibly suspended a base platform 11 by means of load cells 12, there being preferably three such load cells to provide a three-point suspension for the platform. Lengths of cable 13 connect such load cells to superstructures 10a, 10b, 10c, respectively, of framework 10 and to base platform 11, as by means of universal ball and socket fittings (not shown). Mounted on platform 11 are a belt conveyor and drive means therefor.

The belt conveyor includes head and tail roller pulleys 14 and 15, respectively, of cylindrical configuration rotatably supported by upright longitudinal walls 11a and 11b that rise from fixed securement to base platform 11 at and along opposite sides thereof. A conveyor belt 16 is trained about such head and tail pulleys and about a drive pulley 17 and a takeup pulley 18 to provide a flat and elongate upper run 16a as a material receiving and conveying weigh platform that is supported by and on base platform 11.

Conveyor belt drive pulley 17 is driven from an electric motor 19 by a belt 20 connecting motor drive pulley 19a with conveyor driven pulley 21. Motor 19 is securely mounted on base platform 11 as shown. Thus, the entire conveyor is a self-contained unit suspended as a weigh platform.

The head and tail roller pulleys 14 and 15 are rotatably mounted by means of pairs of stub shafts 14a and 15a at respective opposite ends thereof, which preferably extend through the upright walls 11a and 11b, respectively, and are journaled in respective antifriction bearings 22. Such bearings are advantageously mounted in respective bearing housings 23 that are carried in cantilever fashion by respective mounting arms 23a extending rigidly therefrom and secured to the outside faces of the respective upright walls, as by bolting. The outwardly projecting ends of the stub shafts are provided with retainer rings 24 and 25 held securely by setscrews 24a and 25a.

Figure 3:
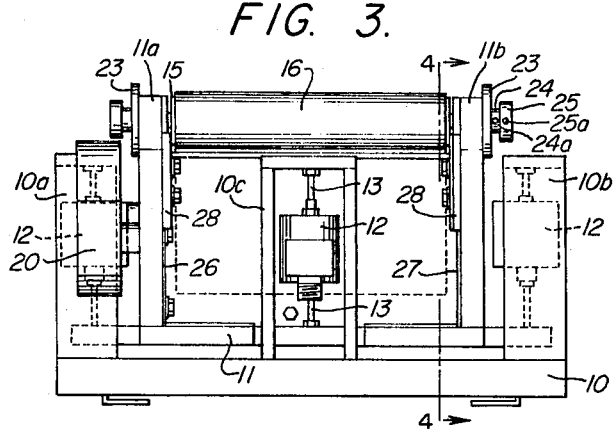
Figure 4:
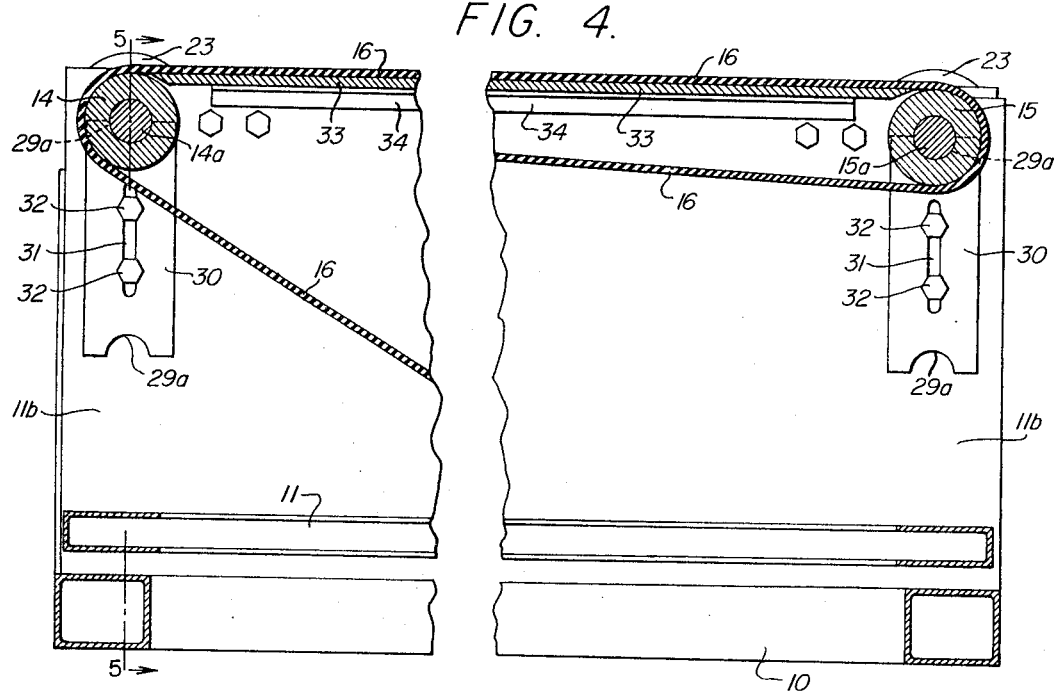

It has been found highly advantageous to provide conveyor belt aligning means to prevent excessive wear of the conveyor belt and adjacent structure. For this purpose there is provided at each end of the roller pulleys 14 and 15 a conveyor belt abutment member projecting from the confronting inside face, 26 or 27, FIG. 3 of the corresponding upright wall 11a or 11b. The abutment members may take a variety of forms and configurations so long as they contact the belt smoothly and serve to prevent hunting from side to side on the rollers. Advantageously, they are coupled with abutment members for the rollers themselves as plate attachments for the inside faces 26 and 27, respectively, of the upright walls. Thus, composite guide plates 28 are provided, each being attached to an inside face of an upright wall opposite an end of a roller pulley 14 or 15. Each comprises a plate 29 FIG. 5 having a concavely arcuate upper end 29a FIG. 4 formed as a cradle for the stub shaft of the pulley, the material of the plate preferably being one of the well-known plastics of antifriction character and the plate being secured face-to-face against the confronting inside face, 26 or 27, of the corresponding upright wall. Each further comprises a second plate 30 secured face-to-face against plate 29 and having a concavely arcuate upper end corresponding 29a conforming to the circumferential curvature of the roller and positioned a slight distance therefrom but in abutting relationship with conveyor belt 16.

Figure 5:
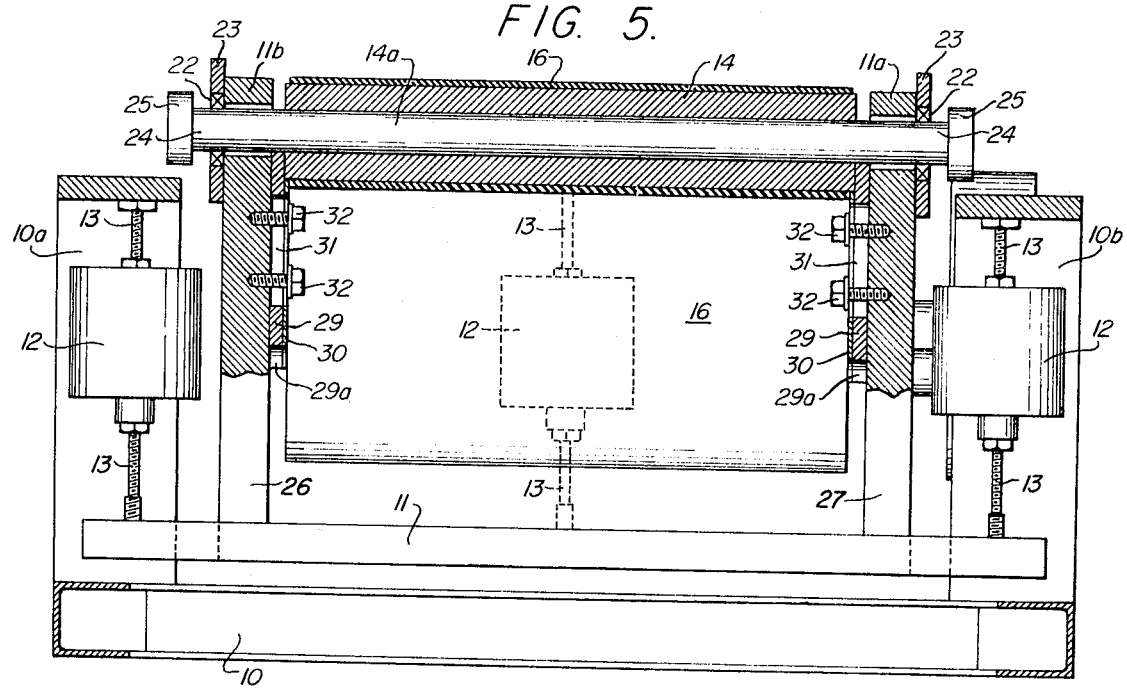

The composite guide plates 28 are preferably formed to be reversible end-for-end, with corresponding concavely arcuate lower ends, as at 29a FIG. 5, so that when one end becomes worn the other end can be used. For this purpose as well as for adjustment purposes, they are preferably made elongate, as shown, with elongate slots 31 extending longitudinally thereof intermediate their lengths to receive attachment bolts 32.

To provide rigid support for upper run 16a of conveyor belt 16, a slide plate 33 is positioned between head and tail roller pulleys 14 and 15 on bracket supports 34 conveniently formed from structural angles. Such slide plate is positioned tangent to the tops of the roller pulleys, preferably exactly as determined by the use of a straightedge during installation.

Whereas this invention is here illustrated and described with respect to preferred forms thereof, it should be realized that various changes can be made.

I claim:

1. A belt conveyor weigh scale, comprising in combination a supporting framework; a base platform suspended from and within said framework; load cells suspending the base platform from the framework; belt conveyor pulleys; means supporting and journaling said pulleys on the base platform to provide a flat and elongate upper run for a conveyor belt adapted to receive and convey material to be weighed; a conveyor belt trained around said pulleys and providing said upper run as a material receiving and conveying weigh platform supported by and on the base platform; and drive means for the belt conveyor pulleys, said drive means being also supported by and on the base platform.

2. A belt conveyor weigh scale in accordance with claim 1, wherein there are three load cells providing a three-point suspension for the base platform.

3. A belt conveyor weigh scale in accordance with claim 1, wherein head and tail pulleys support the upper rum of the belt, and a slide plate is provided immediately below the upper run of the belt and substantially commensurate therewith, its upper surface being substantially tangent to said head and tail pulleys.

4. A belt conveyor weigh scale in accordance with claim 1 which includes head and tail pulleys in the form of respective cylindrical rollers, having stub shafts at their opposite ends, and supporting means for said pulleys in the form of uprights in which said stub shafts are journaled, belt aligning means comprising, at each end of each of said rollers, a conveyor belt abutment member projecting from the confronting inside face of the corresponding upright in spaced relation to the roller.

5. A combination according to claim 4, wherein the roller abutment member is provided by a plate secured face-to-face against the said confronting inside face of the corresponding upright and having a concavely arcuate edge positioned as a cradle bearing for the corresponding stub shaft of the roller; and wherein the conveyor belt abutment member is provided by a second plate secured face-to-face against the first plate and having a concavely arcuate edge conforming to the circumferential curvature of the roller and slightly spaced apart from said roller.

6. A combination according to claim 4, wherein the first plate is of a plastic material providing an antifriction bearing surface for the roller stub shaft.

7. A combination according to claim 4, wherein the two plates are adjustably secured to the upright for movement toward and away from the axis of the roller.

8. A belt conveyor weigh scale in accordance with claim 1, wherein head and tail pulleys in the form of respective cylindrical rollers having stub shafts at their opposite ends support the upper run of the belt; the means supporting and journaling said head and tail pulleys comprise antifriction bearings secured to uprights rising from the base platform, said stub shafts being respectively received and journaled by said bearings.

9. A belt conveyor weigh scale in accordance with claim 8, wherein the stub shafts extend into the uprights from respective mutually confronting inside faces thereof; and wherein there are additionally provided belt aligning means that comprise, at each end of each of said rollers, a conveyor belt abutment member projecting from the confronting inside face of the corresponding upright in spaced relation to the roller.

10. A belt conveyor weigh scale in accordance with claim 9, wherein the antifriction bearings are mounted in respective bearing housings that are carried in cantilever fashion by respective mounting arms extending rigidly therefrom and secured to the outside faces of respective uprights.

11. A belt conveyor weigh scale in accordance with claim 9, wherein the belt aligning means also comprise, at each end of each of the rollers, a roller abutment member projecting from the confronting inside face of the corresponding upright.

12. A belt conveyor weigh scale in accordance with claim 11, wherein the roller abutment member is provided by a plate secured face-to-face against the said confronting inside face of the corresponding upright and having a concavely arcuate edge positioned as a cradle bearing for the corresponding stub shaft of the roller; and wherein the conveyor belt abutment member is provided by a second plate secured face-to-face against the first plate and having a concavely arcuate edge conforming to the circumferential curvature of the roller and slightly spaced apart from said roller.

13. A belt conveyor weigh scale in accordance with claim 12, wherein the first plate is of a plastic material providing an antifriction bearing surface for the roller stub shaft.

14. A belt conveyor weigh scale in accordance with claim 12, wherein the two plates are adjustably secured to the upright for movement toward and away from the axis of the roller.

* * * * *